United States Patent [19]

Sakakibara et al.

[11] 4,048,852
[45] Sept. 20, 1977

[54] INTEGRATING CALORIMETER

[75] Inventors: Kaichi Sakakibara, Kyoto; Hiroyuki Sumida, Kagawa, both of Japan

[73] Assignees: Kabushiki Kaisha Takuma; Ryusho Sangyo Kabushiki, both of Osaka, Japan

[21] Appl. No.: 694,289

[22] Filed: June 9, 1976

[30] Foreign Application Priority Data

June 12, 1975  Japan .................................. 50-71798
June 12, 1975  Japan .................................. 50-71800
June 12, 1975  Japan ............................ 50-80369[U]

[51] Int. Cl.² .......................................... G01K 17/16
[52] U.S. Cl. ................................................ 73/193 R
[58] Field of Search .................................... 73/193 R

[56] References Cited

U.S. PATENT DOCUMENTS

| | | | |
|---|---|---|---|
| 3,301,049 | 1/1967 | Meyerson | 73/193 |
| 3,537,311 | 11/1970 | Bornstein | 73/193 |
| 3,617,713 | 11/1971 | Karlsson | 73/193 |
| 3,731,072 | 5/1973 | Johnston | 73/193 |
| 3,872,722 | 3/1975 | Karlsson | 73/193 |
| 3,979,952 | 9/1976 | Bornstein et al. | 73/193 |

*Primary Examiner*—Herbert Goldstein
*Attorney, Agent, or Firm*—Edwin E. Greigg

[57] ABSTRACT

An integrating flow calorimeter for measuring and indicating the cumulative heat exchanged between a load equipment and a heat-conveying liquid circulating therethrough.

A flow measuring device continuously measures the quantity of liquid circulated through the load equipment, and closes a switch for a predetermined fixed interval of time each time a predetermined quantity of the liquid has been supplied to the load equipment. The switch connects a differential temperature measuring device to an electrical power source, which can be a battery mounted integral with the meter.

The differential temperature measuring device includes temperature sensors which sense the temperatures of the liquid supplied to, and exhausted from the load equipment. During the time the differential temperature measuring device is energized, the difference between the supply and exhaust liquid temperatures is converted into a pulsed output signal, in which the frequency of the pulses is directly proportional to the sensed differential temperature of the liquid.

The pulsed output signals are transmitted to a counting device, which counts the number of pulses therein, and operates an indicating register which indicates the total quantity of heat supplied to the load equipment.

The meter can also include a regulating device for adjusting the fixed time interval during which the switch is closed, to thereby compensate for manufacturing error in the flow measuring device.

Also, the temperature sensors can be p-n juncture semiconductor devices, which are easily installed in existing liquid lines.

8 Claims, 2 Drawing Figures

INTEGRATING CALORIMETER

BACKGROUND OF THE INVENTION

1. Field of the Invention

The invention lies in the field of heat measurement, in particular, the continuous measurement of the quantity of heat exchanged in a load equipment by a heat-conveying liquid flowing therethrough by an integrating flow calorimeter.

2. Description of the Prior Art

When a heat-conveying liquid is used as a heating or cooling medium and is supplied to individual dwellings in a housing area or district, and an integrating flow calorimeter is used to continuously sense and indicate the total quantity of heat supplied to, or removed from, the load equipment by the heat-conveying liquid, it is very desirable that the electric power required for running the calorimeter be supplied by a battery incorporated in the device. However, prior to the present invention, known integrating flow calorimeters required comparatively large quantities of electrical power for their operation, and thus could not be continuously operated for long periods of time by a battery which could be integrally mounted within the meter.

Also, in prior known integrating flow calorimeters having a rotating vane type of liquid flowmeter, the speed ratio of a geared transmission system was adjusted in order to calibrate the flowmeter and correct for any inherent measurement error. This involved changing the gears in the transmitting system to obtain the correct combination of gears and thus the correct speed ratio, a procedure which was both difficult and time-consuming.

Also, prior to the present invention, copper resistance sensing elements had generally been used as the sensing elements to measure the supply and exhaust temperatures of the heat-conveying liquid. However, these copper resistance sensing elements were too large in size to be installed in a pipe of a size which would otherwise be normal and adequate for many load equipments, for example, load equipment for heating individual dwelling houses. These copper resistance sensing elements were not only difficult to install, but considerably increased the flow resistance of the liquid path.

OBJECTS AND SUMMARY OF THE INVENTION

It is therefore an object of this invention to provide an integrating flow calorimeter for continuously measuring and indicating the total heat exchanged between a load equipment and a heat-conveying liquid flowing therethrough, which requires a relatively small quantity of electric power, and which can thus be operated for long periods of time by an electric battery contained therein.

It is another object of the invention to provide a simple and convenient means for correcting the manufacturing error in a rotating-vane type of liquid flow measuring device constituting a component element of an integrating flow calorimeter.

It is a further object of the invention to provide a temperature sensing element of an integrating flow calorimeter which is compact in size, and can be easily installed in normal sized, liquid supply and return pipes, with very little increase in the flow resistance of these pipes.

The total heat supplied or received in a load equipment by a heat-conveying liquid is determined by the quantity of liquid flowing through the load equipment and the difference in the entering and leaving temperature of the liquid. Generally speaking, the hourly change of the sensed differential temperature of the liquid as it enters and leaves the load equipment is extremely small, so that an accurate measure of the heat exchanged can still be obtained even if the temperature difference of the liquid is only measured intermittently. Thus, if the differential temperature of the liquid is sensed for only a very short period of time each time a predetermined quantity of liquid is supplied to the load equipment, and it is assumed that any change in the differential temperature of the liquid will be extremely small during the entire time required for the predetermined sensed quantity of liquid to flow through the load equipment, both factors—the liquid quantity and temperature difference— necessary to determine the total quantity of heat exchanged, will have been measured.

The present invention utilizes such an intermittent measurement of the differential temperature to greatly reduce the electrical power otherwise required for operating the meter, while still providing a sufficiently accurate measurement of the total heat supplied, thus making it possible to operate the meter for long periods of time, using electric power supplied by a battery which is incorporated into the meter. Also, by rational utilization of the power saving construction, an integrating flow calorimeter is furnished, in which manufacturing error in the liquid flowmeter can be easily and quickly corrected.

The present invention includes a conventional flowmeter for continuously measuring the quantity of liquid supplied to the load equipment. A switching device, coupled to the flowmeter, is closed (or opened, depending on the particular connecting circuitry) by the flowmeter for a length of time determined by the rate of flow of the liquid, each time a predetermined quantity of liquid has been supplied to the load equipment. When this switching device is closed, it activates a pulse signal transmitter, which transmits a pulse signal of predetermined, fixed, time duration to a normally open, electrically operated power switch or gate device, for closing this power switch during the duration of the actuating pulse signal. The pulse signal transmitter is only activated once each time the switching device closes, and the switching device must be opened and reclosed to again activate the pulse signal transmitter, so that when the switching device is closed longer than the predetermined duration of the pulse signal produced by the pulse signal transmitter, as, for example, when there is little or no flow of liquid through the load equipment, only one pulsed signal will be transmitted to close the electrically operated power switch.

When the power switch closes, it connects a differential temperature measuring device to its operating electrical power source. The differential temperature measuring device includes a first temperature sensor disposed with a liquid supply line to the load equipment, and a second temperature sensor disposed within an exhaust liquid line from the load equipment, each of which produce a voltage proportional to the temperature of the liquid within the respective liquid lines during the predetermined time interval the power switch is closed.

The voltage difference between the voltages produced by the two temperature sensors, which is directly proportional to the temperature difference between the temperature of the liquid being supplied to the load equipment and the temperature of the liquid being exhausted from the load equipment, is converted by a voltage-to-frequency converter into a pulsed output signal, in which the frequency of the pulses, or the actual number of pulses, is directly proportional to the sensed difference in temperature between the supply and exhaust temperatures of the liquid flowing through the load equipment.

Each pulsed output signal produced when the power switch is closed is transmitted to a counter device, which counts the number of pulses, and transmits an ordering signal to a cumulative indicating register after counting a predetermined number of pulses corresponding to a measuring unit of heat supplied to the load equipment, where it is added to a previous numerical total of heat measuring units, stored in the indicating resistor, to thereby indicate the total heat supplied to the load equipment by the heat-conveying liquid.

The pulse signal transmitter can also include a pulse interval adjusting device. Since the pulse number counted by the counting device is determined by the operating period of the differential temperature measuring device as well as the measured value of differential temperature, and this operating period corresponds to the measured predetermined quantity of liquid which has been supplied to the load equipment, this operating period can be adjusted to compensate for measurement error of the flowmeter. Thus, any measurement error in the flowmeter due to errors in manufacturing the flowmeter can be quickly corrected by as simple a method as adjusting a dial of the pulse interval adjusting device.

A p-n junction semiconductor device can be used to sense the supply and exhaust liquid temperatures. Not only are such semiconductor devices less expensive than copper resistance sensing elements, but can be made in very small sizes. Thus, they are easily installed in the integrating flow calorimeter, which generally requires compact construction as a whole, and the flow resistance to the heat conveying liquid produced by the sensing element installation can be made very small, which is very advantageous in practical use. The p-n junctures used can be fabricated from any of the commonly used semiconducting materials, such as silicon or germanium. The forward voltage drop through the p-n junction varies linearly with temperature, and can thus be used to accurately sense the liquid temperature. For example in the case of a silicon p-n junction device, the voltage drop $V_F$ in the forward direction is $$V_F = V_o - 2.5 \times 10^{-3} t$$

where $V_o$ is the normal voltage drop at 0° C. and $t$ is the temperature in degrees centrigrade. From this equation, it is clear that $V_F$ varies linearly with temperature at the rate of 2.5 mV/° C.

The invention will be better understood as well as other objects and advantages thereof become more apparent from the following detailed description of the invention taken in conjunction with the drawings.

DESCRIPTION OF A PREFERRED EMBODIMENT

Figure 1:
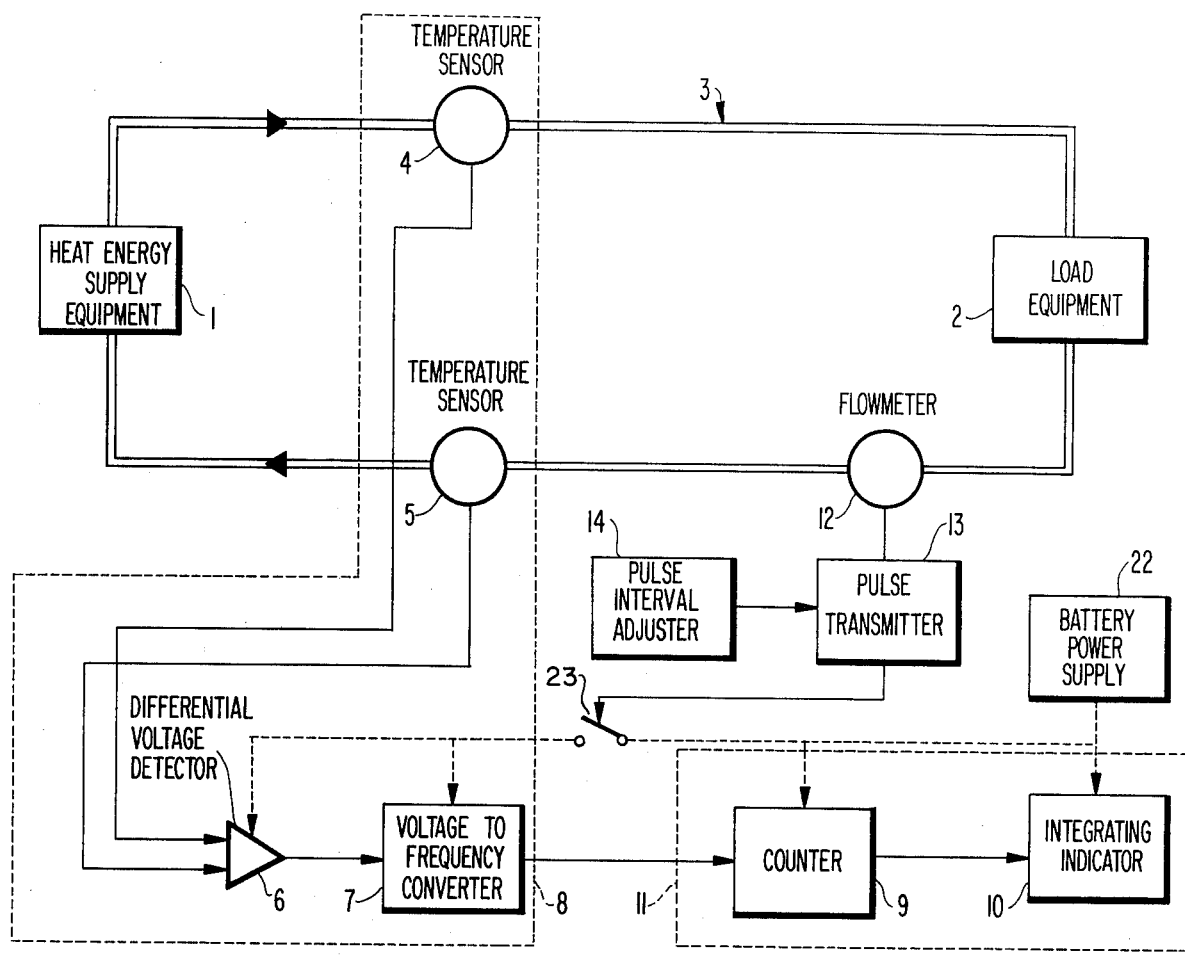
FIG. 1 is a schematic block diagram of a preferred embodiment of the invention.

As shown in FIG. 1, a heat-conveying liquid, such as high temperature water, is circulated in a liquid flow path 3 through or about a heat energy supply equipment 1, a load equipment, or heat exchanger 2, a first temperature sensing element 4 which measures the supply temperature of the liquid entering the load equipment 2, and a second temperature sensing element 5, which measures the exhaust temperature of the liquid leaving the load equipment 2. A differential voltage detecting element 6 is connected to the temperature sensing elements 4, 5 and, when energized, detects the temperature difference of the temperatures measured by the temperature sensing elements 4, 5 as a voltage difference, which is transmitted to a voltage-to-frequency converting device 7, which, when energized, generates a pulsed signal, in which the pulse frequency, and thus the number of pulses per unit time, is directly proportional to the detected voltage difference. The two temperature sensing elements 4, 5, the differential voltage detecting element 6, and the voltage-to-frequency converting device 7 make up the differential temperature detecting device 8.

The pulsed output signal generated by the voltage-to-frequency converting device is transmitted to a counting device 9, which counts the number of pulses of the pulsed signal and transmits an ordering signal to an integrating indicating device 10 when the number of pulses counted by the counting device 9 reaches a predetermined value. The counting device 9 and the integrating indicating device 10 make up the indicating device 11.

A flow detecting device 12, also disposed within the liquid flow path 3, continuously detects the liquid flow passed through the load equipment 2, and activates a pulse transmitting device 13 each time a predetermined quantity of liquid has been supplied to the load equipment. When so activated, the pulse transmitting device 13 transmits a pulse signal for a predetermined interval of time. A pulse interval adjusting device 14, connected to the pulse transmitting device 13, is used to adjust the fixed time interval of the pulse signal.

Both of the temperature sensing elements 4, 5 are semiconductor p-n junction devices, whose forward voltage drop across the junction is used to convert the temperature of the liquid to a voltage signal, as discussed previously.

Figure 2:
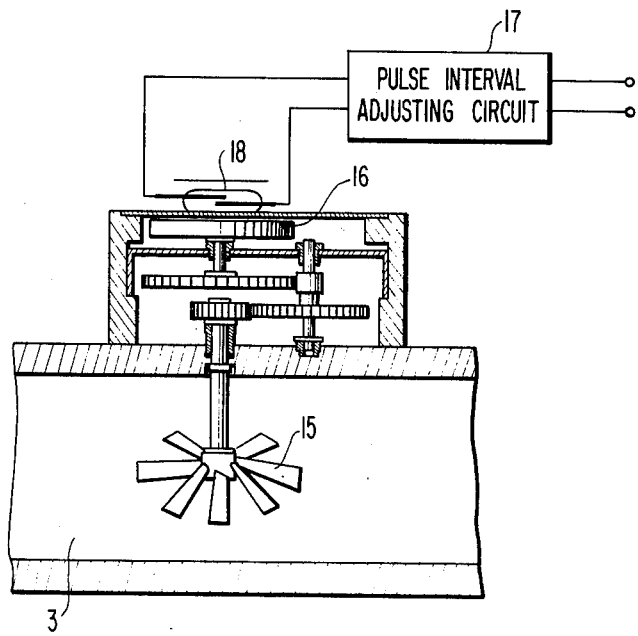
FIG. 2 is a partial cross-sectional view of the liquid flowmeter portion of the integrating flow calorimeter.

Referring now to FIG. 2, the flow detecting device 12 includes a vane wheel and shaft assembly 15, which is rotated about a longitudinal axis of the vane wheel and shaft assembly 15 by the liquid flowing in the liquid flow path 3. The flow detecting device 12 also includes a magnetic element 16, which is rotated by the vane wheel and shaft assembly 15 through a gear train coupling the two. A magnetically-operated reed switch 18, is disposed so as to be in close proximity to the magnetic element 16 at one position during its rotation, so that this reed switch 18 will be operated by the magnetic element 16 each time the magnetic element 16 makes one complete revolution. The reed switch 18 is connected to a pulse interval adjusting circuit 17, which produces a pulse output signal of predetermined duration each time the reed switch 18 is operated by the magnetic element 16.

The above mentioned indicating device 11 includes the counting device 9 which counts the number of pulses in the pulsed output signals from the differential temperature detecting device 8 and transmits an output pulse by overflowing after counting a predetermined number of pulses, and the integrating and indicating device 10 which is actuated by the output pulse from the counting device 9.

A battery power supply 22, for supplying the necessary electric power to the differential voltage detecting element 6, the voltage-to-frequency converting device 7, the counting device 9 and the integrating and indicating device 10, is integrally mounted with the meter. However, the differential voltage detecting element 6 and the voltage-to-frequency converting device 7 are connected to the battery power supply 22 through a normally open, electrically operated, switch or gate 23 and are only activated when this switch 23 is closed. The electrically operated switch 23 is closed by the pulse output signal transmitted by the pulse transmitter 13, and thus is closed for a predetermined, fixed interval of time each time the magnetic element 16 makes one complete revolution indicating that the predetermined quantity of liquid has been supplied to the load equipment 2. Since power is only supplied to the differential temperature detecting device 8 during this short, fixed interval of time, a large power saving is effected.

The number of pulses in each pulsed output signal of the differential temperature detecting device 8 is directly proportional to the differential temperature of the circulating liquid. Also, since each pulsed output signal is of a fixed, predetermined duration, and a pulsed output signal is produced each time a predetermined quantity of liquid has passed through the load equipment 2, the total number of pulses counted over any period of time is proportional to both the flow quantity and the differential temperature of the liquid, and thus can be used as a measure of the total heat supplied to the load equipment during the same period of time.

What is claimed is:

1. An integrating flow calorimeter means for measuring heat exchanged between a load equipment and a liquid circulating therethrough, which comprises:
   an electric battery mounted integral with the integrating flow calorimeter means;
   a differential temperature measurement means operable when connected to said battery, said differential temperature measurement means including a liquid supply temperature sensing means for producing a first voltage proportional to the temperature of the liquid being supplied to the load equipment and a liquid exhaust temperature sensing means for producing a second voltage proportional to the temperature of the liquid being exhausted from the load equipment, each of said temperature sensing means comprising a temperature sensor of semiconducting materials having a P-N junction therein;
   a switch means for connecting said differential temperature measurement means to said battery, when said switch means is closed, said switch means being a normally open, electrically operated switch means;
   a liquid flow measurement means for continuously measuring the quantity of liquid being supplied to said load equipment, and for closing said switch means each time a predetermined quantity of liquid has been supplied to the load equipment; and
   integrating means, adapted to receive signals from said differential temperature measurement means, for indicating the total heat supplied to the load equipment.

2. An integrating flow calorimeter means, as described in claim 1, wherein said liquid flow measurement means includes:
   a liquid flow measuring device; and
   a pulse signal transmitter, coupled to said liquid flow measuring device, for transmitting an electrical pulse signal of predetermined duration to said switch means to close said switch means for the duration of the pulse signal each time said predetermined quantity of liquid has been supplied to the load equipment, said pulse signal transmitter having a pulse interval regulating means for adjusting said predetermined duration of said pulse signal.

3. An integrating flow calorimeter means, as described in claim 2, wherein said differential temperature measurement means further includes:
   a voltage-to-frequency conversion means, actuated by said power supply through said switch means, for actuating said temperature sensing means, sensing the voltage difference between said first and second voltages, and converting said voltage difference into a pulsed output signal wherein the frequency of the pulses are directly proportional to the sensed voltage difference.

4. An integrating flow calorimeter means, as described in claim 3, wherein said integrating means includes:
   a pulse counting means, connected to receive said pulsed output signal, for counting said pulses and transmitting a recording signal to an integrating indicating means each time the count of said pulses reaches a predetermined number equivalent to a predetermined quantity of heat supplied by the liquid to the load equipment; and
   said integrating indicating means, which comprises an electro-magnetic counter device, for counting the number of recording signals and indicating the total cumulative heat exchanged between the liquid and the load equipment.

5. An integrating flow calorimeter means, as described in claim 4, wherein said liquid flow measuring device, comprises:
   a rotatable vane wheel and shaft assembly disposed in a passage for liquid being supplied to the load equipment, and rotatable about an longitudinal axis of said vane wheel and shaft assembly by the force exerted on the vane wheel by the flowing liquid;
   a rotatable magnetic member, coupled by gear train means for rotation by said vane wheel and shaft assembly;
   said gear train coupling means; and
   a magnetic switching means for actuating said pulse signal transmitter, said magnetic switching means being disposed in close proximity to the plane of rotation of said magnetic member so that said magnetic switching means is actuated by said magnetic member each time said magnetic member makes one complete revolution; whereby
   said pulse signal transmitter transmits a pulse of predetermined duration to said switch means each time said pulse signal transmitter is actuated by said magnetic switching means.

6. An integrating flow calorimeter means, as described in claim 5, wherein said pulse signal transmitter includes a regulating means for adjusting said predetermined duration of said pulse signal transmitted by said pulse signal transmitter.

7. An integrating flow calorimeter means, as described in claim 1, wherein heat is supplied to the load equipment by the liquid circulating therethrough.

8. An integrating flow calorimeter means, as described in claim 1, wherein heat is supplied by the load equipment to the liquid circulating therethrough.

* * * * *